United States Patent
Sato et al.

(10) Patent No.: US 8,190,928 B2
(45) Date of Patent: May 29, 2012

(54) POWER-ON DETECTION CIRCUIT AND MICROCONTROLLER

(75) Inventors: Shuhei Sato, Kawasaki (JP); Takashi Sato, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 550 days.

(21) Appl. No.: 12/392,674

(22) Filed: Feb. 25, 2009

(65) Prior Publication Data

US 2009/0319764 A1 Dec. 24, 2009

(30) Foreign Application Priority Data

Jun. 20, 2008 (JP) .................................. 2008-162123

(51) Int. Cl.
*G06F 1/26* (2006.01)

(52) U.S. Cl. .......................... 713/300; 713/323; 713/324

(58) Field of Classification Search .................. 713/300
See application file for complete search history.

(56) References Cited

U.S. PATENT DOCUMENTS

| 4,284,849 | A | * | 8/1981 | Anderson et al. | ............... 379/38 |
| 5,136,300 | A | * | 8/1992 | Clarke et al. | ................. 342/175 |
| 6,070,021 | A | * | 5/2000 | Sato | ............................. 396/429 |
| 6,153,945 | A | * | 11/2000 | Koss et al. | ................... 307/10.1 |
| 2003/0196140 | A1 | * | 10/2003 | Kurosawa | ....................... 714/25 |
| 2005/0219904 | A1 | * | 10/2005 | Sakurai et al. | ........... 365/185.18 |
| 2007/0103944 | A1 | * | 5/2007 | Mori | ........................ 363/21.12 |

FOREIGN PATENT DOCUMENTS

JP 08-080810 3/1996

* cited by examiner

*Primary Examiner* — Nitin Patel

(74) *Attorney, Agent, or Firm* — Arent Fox LLP

(57) ABSTRACT

There is provided a power-on detection circuit including: a flip-flop circuit storing an indefinite value at the time of power-on and outputting plural-bit data; and a comparator comparing the plural-bit data output from the flip-flop circuit and a plural-bit fixed value and outputting a power-on detect flag depending on a comparison result thereof.

8 Claims, 4 Drawing Sheets

US 8,190,928 B2

POWER-ON DETECTION CIRCUIT AND MICROCONTROLLER

CROSS-REFERENCE TO RELATED APPLICATIONS

This application is based upon and claims the benefit of priority of the prior Japanese Patent Application No. 2008-162123, filed on Jun. 20, 2008, the entire contents of which are incorporated herein by reference.

FIELD

The present embodiment is related to a power-on detection circuit and a microcontroller.

BACKGROUND

FIG. 2 is a view depicting a configuration example of a microcontroller 201 including a voltage detection circuit 203, and FIG. 3 is a timing chart depicting an operation example of the microcontroller 201 in FIG. 2. When a power switch SW is turned on at a time t1, a power supply voltage V1 rises from a ground potential to a voltage V. The microcontroller 201 includes a CPU (central processing unit) 202, the voltage detection circuit 203, a resistance R and capacitance C, and inputs the power supply voltage V1. A power supply voltage V2 becomes a voltage obtained by delaying the power supply voltage V1 by a time constant circuit (delay circuit) configured by the resistance R and the capacitance C. The voltage detection circuit 203 outputs a power-on detect flag PR depending on the power supply voltage V2. The power-on detect flag PR becomes a low level when the power supply voltage V2 is less than a threshold value, and the power-on detect flag PR becomes a high level when the power supply voltage V2 is equal to or more than the threshold value. At a time t2, the power-on detect flag PR becomes the high level and power-on by the power switch SW is detected. The CPU 202 performs a process depending on the power-on detect flag PR.

However, in order to detect power-on, an analog circuit such as the time constant circuit (including the resistance R and the capacitance C) and the voltage detection circuit 203, and so on are needed. A circuit parameter of the analog circuit depends on a semiconductor process significantly. Therefore, according to development of semiconductor microfabrication technique, it is necessary to develop a circuit newly every process rule, and influence on a development period and a development cost is significant. Further, the analog circuit is generally large compared with a digital circuit (logic circuit), and it is impossible to ignore influence on a circuit size as well.

Japanese Laid-open Patent Publication No. 08-80810 discloses a power cut-off detecting device in an apparatus equipped with a security mechanism, which is a device to detect an occurrence of a power cut-off state in the apparatus equipped with the security mechanism and includes: a power cut-off storing unit in which a storage content is damaged when a power supply to the apparatus is cut off; and a microcomputer judging that power cut-off is performed and performing a prescribed security process in the case when the storage content in the power cut-off storing unit is damaged at the time when reset starts.

SUMMARY

According to an aspect of an embodiment, a power-on detection circuit includes: a flip-flop circuit storing an indefinite value at the time of power-on and outputting plural-bit data; and a comparator comparing the plural-bit data output from the flip-flop circuit and a plural-bit fixed value and outputting a power-on detect flag depending on a comparison result thereof.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENTS

Figure 4:
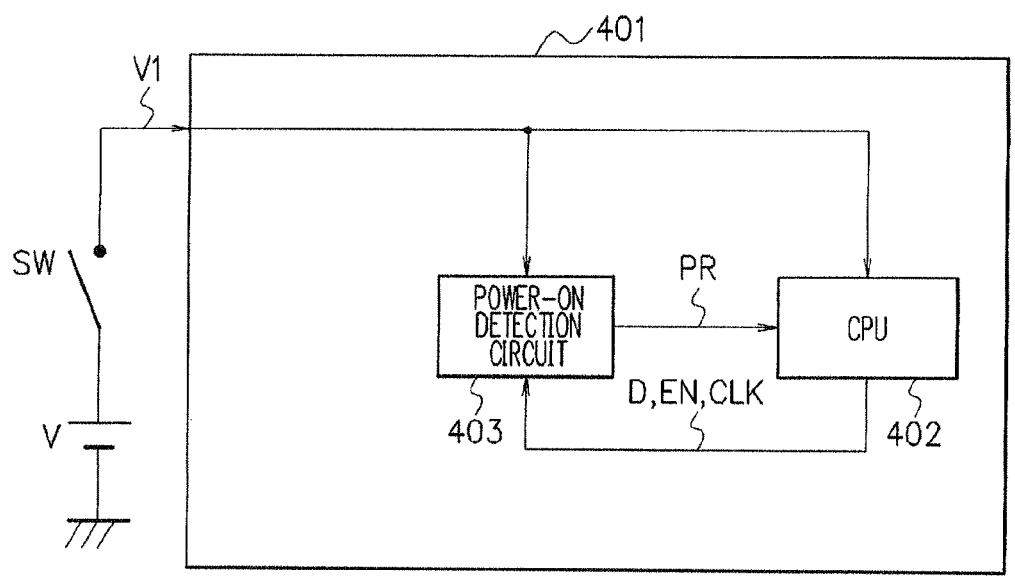
FIG. 4 is a view depicting a configuration example of a microcontroller including the power-on detection circuit according to the present embodiment.

FIG. 4 is a view depicting a configuration example of a microcontroller 401 including a power-on detection circuit 403 according to the present embodiment. When a power switch SW is turned on, a power supply voltage V1 rises from a ground potential to a voltage V. The microcontroller 401 includes a CPU (central processing unit) 402 and the power-on detection circuit 403, and inputs the power supply voltage V1. The power supply voltage V1 is input to the CPU 402 and the power-on detection circuit 403. The power-on detection circuit 403 is configured by a digital circuit (logic circuit), and detects power-on and outputs a power-on detect flag PR. The power-on detect flag PR becomes a high level when power-on by the power switch SW is detected. The configuration of the power-on detection circuit 403 will be explained later with reference to FIG. 1 and so on. The CPU 402 performs a process depending on the power-on detect flag PR. Further, the CPU 402 outputs data D, an enable signal EN and a clock signal CLK to the power-on detection circuit 403.

The power-on detection circuit 403 is configured by the digital circuit, and thereby, the power-on detection circuit 403 is excellent in compatibility with a semiconductor process rule compared with an analog circuit. Further, since a circuit configuration thereof is simple, a development period, a development cost, and a circuit size thereof can be decreased, and a function to detect power-on can be realized easily. For example, the development period results in about 1/20, and the circuit size results in about 1/8 by area ratio. Further, since a circuit design can be performed by using an HDL (hardware description language) in the digital circuit, logically synthesizing makes it easier to convert to various process rules, as a result that dependency on the semiconductor process is small.

Figure 1:
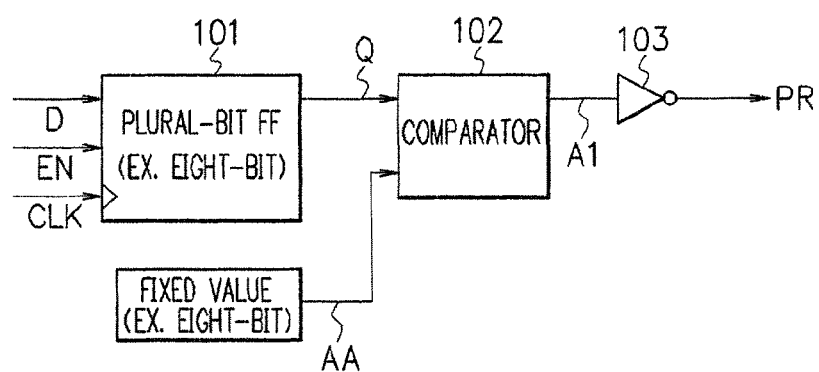
FIG. 1 is a view depicting a configuration example of a power-on detection circuit according to the present embodiment.
Figure 2:
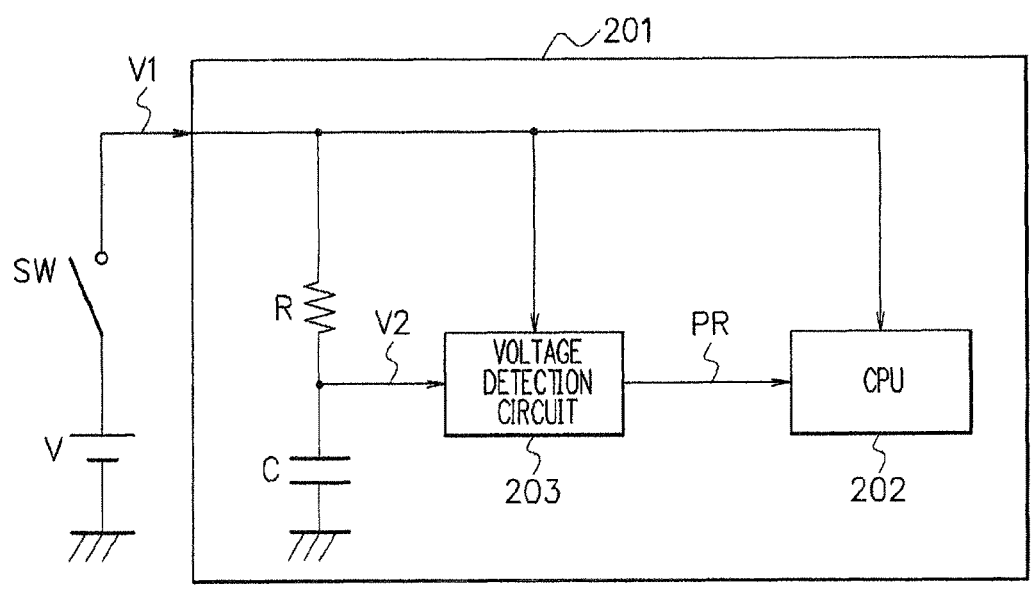
FIG. 2 is a view depicting a configuration example of a microcontroller including a voltage detection circuit.
Figure 3:
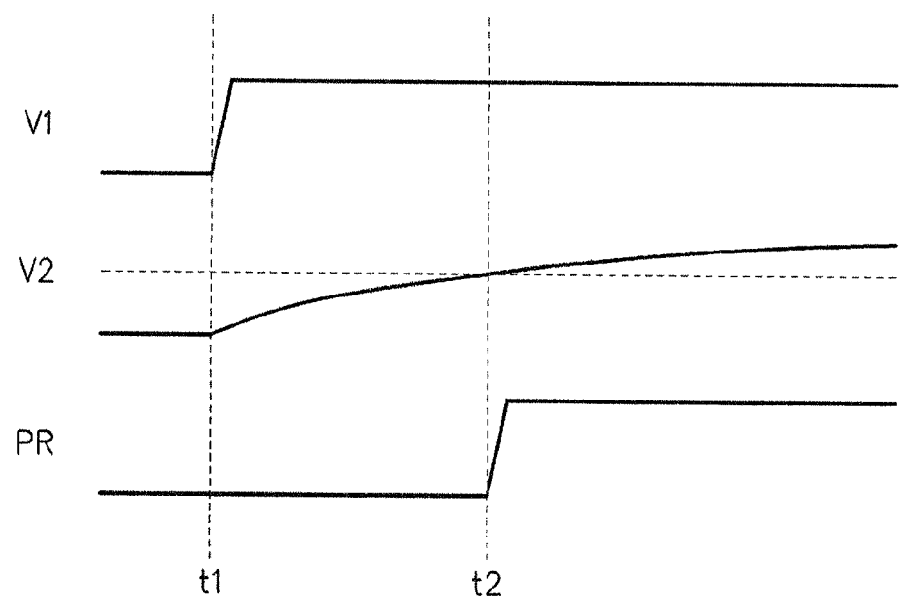
FIG. 3 is a timing chart depicting an operation example of the microcontroller in FIG. 2.

FIG. 1 is a view depicting a configuration example of the power-on detection circuit 403 in FIG. 4. The power-on detection circuit 403 includes a plural-bit flip-flop circuit 101, a comparator 102, and an inverter 103, and is configured by the digital circuit. The plural-bit flip-flop circuit 101 is, for example an eight-bit flip-flop circuit, and inputs the plural-bit (for example eight-bit) data D, the enable signal EN and the clock signal CLK from the CPU 402, and outputs plural-bit (for example eight-bit) data Q. Concretely, when the enable signal EN becomes the high level, the plural-bit flip-flop circuit 101 latches the data D in synchronization with the clock signal CLK, and outputs the latched data as the output data Q. The plural-bit flip-flop circuit 101 stores an indefinite value at the time of power-on. The comparator 102 compares the plural-bit data Q and a plural-bit fixed value AA, and outputs a power-on detect flag A1 depending on a comparison result thereof. The number of bits of the fixed value AA is the same as the number of bits of the data Q. The power-on detect flag A1 becomes a low level when the data Q and the fixed value AA are inconsistent with each other, and the power-on detect flag A1 becomes the high level when the data Q and the fixed value AA are consistent with each other. The inverter 103 logically inverts the power-on detect flag A1 and outputs the logically inverted power-on detect flag A1 as the power-on detect flag PR.

Figure 5:
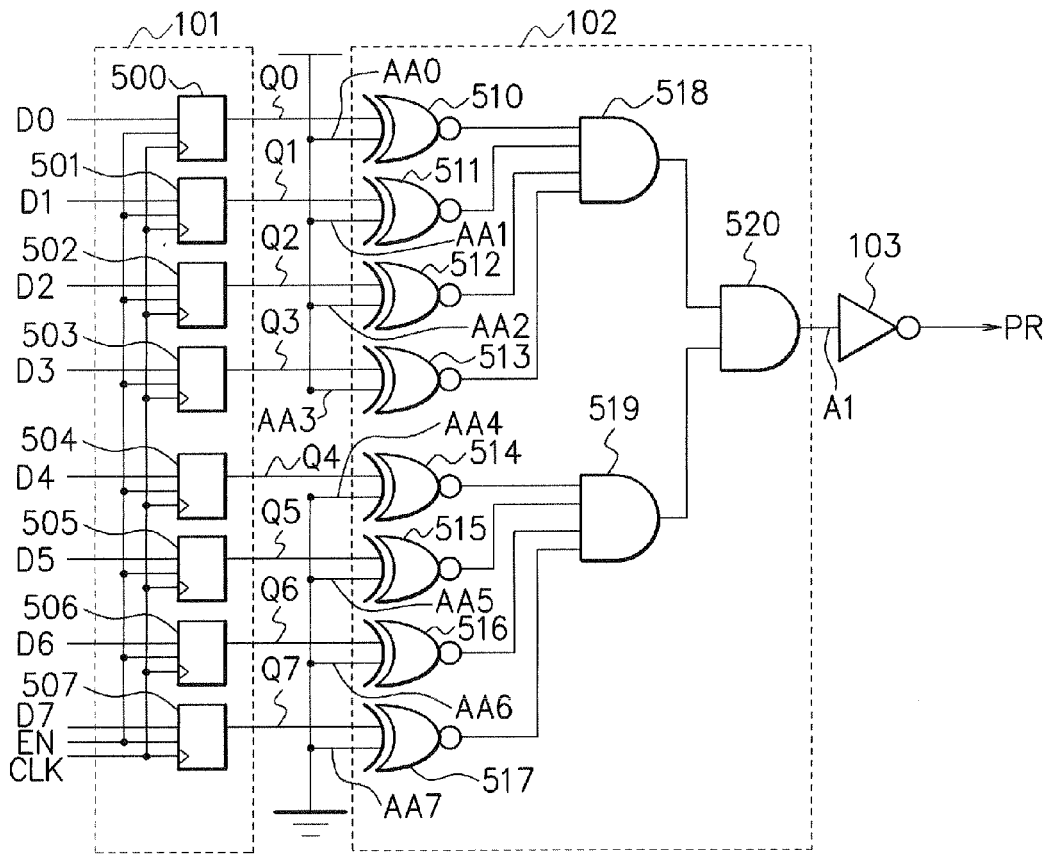
FIG. 5 is a circuit diagram depicting a configuration example of the power-on detection circuit in FIG. 1.

FIG. 5 is a circuit diagram depicting a configuration example of the power-on detection circuit in FIG. 1. The plural-bit flip-flop circuit 101 includes eight flip-flop circuits 500 to 507. The comparator 102 includes eight exclusive negative logical sum (XNOR) circuits 510 to 517 and three logical product (AND) circuits 518 to 520. Eight-bit data D0 to D7 correspond to the eight-bit data D in FIG. 1. Eight-bit data Q0 to Q7 correspond to the eight-bit data Q in FIG. 1.

Eight-bit fixed values AA0 to AA7 correspond to the eight-bit fixed value AA in FIG. 1. The low-order four-bit fixed values AA0 to AA3 are for example at the high level. The high-order four-bit fixed values AA4 to AA7 are for example at the low level. As for the eight-bit fixed values AA0 to AA7, it is preferable that the number of bits of the fixed values AA0 to AA3 of the value "1" corresponding to the high level and the number of bits of the fixed values AA4 to AA7 of the value "0" corresponding to the low level are the same.

The flip-flop circuits 500 to 507 input the data D0 to D7 respectively, and when the enable signal EN becomes the high level, the flip-flop circuits 500 to 507 latch the data D0 to D7 respectively in synchronization with the clock signal CLK, and output the latched data respectively as the output data Q0 to Q7.

The exclusive negative logical sum circuits 510 to 517 output exclusive negative logical sum signals of the data Q0 to Q7 and the fixed values AA0 to AA7. For example, the exclusive negative logical sum circuit 510 outputs the exclusive negative logical sum signal of the data Q0 and the fixed value AA0. That is, the exclusive negative logical sum circuit 510 outputs a signal at the high level (indicating "1") as the exclusive negative logical sum signal when the data Q0 and the fixed value AA0 are the same value, and the exclusive negative logical sum circuit 510 outputs a signal at the low level (indicating "0") as the exclusive negative logical sum signal when the data Q0 and the fixed value AA0 are the different values.

The logical product circuit 518 outputs a logical product signal of output signals from the exclusive negative logical sum circuits 510 to 513. Concretely, the logical product circuit 518 outputs the logical product signal at the high level when the four-bit data Q0 to Q3 and the four-bit fixed values AA0 to AA3 are all the same value, and otherwise the logical product circuit 518 outputs the logical product signal at the low level.

The logical product circuit 519 outputs the logical product signal of output signals from the exclusive negative logical sum circuits 514 to 517. Concretely, the logical product circuit 519 outputs the logical product signal at the high level when the four-bit data Q4 to Q7 and the four-bit fixed values AA4 to AA7 are all the same value, and otherwise the logical product circuit 519 outputs the logical product signal at the low level.

The logical product circuit 520 outputs the logical product signal of the output signals from the logical product circuits 518 and 519 as the power-on detect flag A1. Concretely, the logical product circuit 520 outputs the logical product signal at the high level when the eight-bit data Q0 to Q7 and the eight-bit fixed values AA0 to AA7 are all the same value, and otherwise the logical product circuit 520 outputs the logical product signal at the low level.

The inverter 103 logically inverts the power-on detect flag A1 and outputs the logically inverted power-on detect flag A1 as the power-on detect flag PR. The power-on detect flag PR becomes the low level when the eight-bit data Q0 to Q7 and the eight-bit fixed values AA0 to AA7 are all the same value, and otherwise the power-on detect flag PR becomes the high level.

Figure 6:
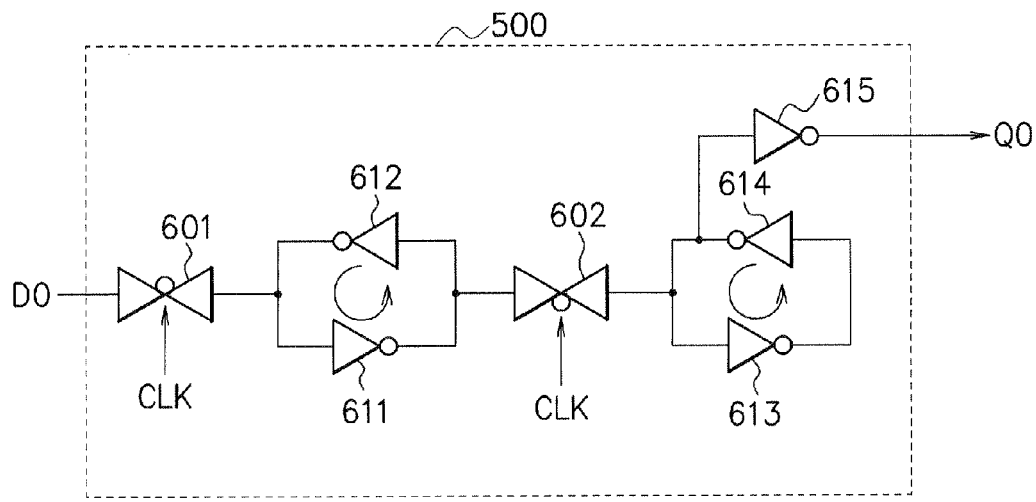
FIG. 6 is a circuit diagram depicting a configuration example of a flip-flop circuit in FIG. 5.

FIG. 6 is a circuit diagram depicting a configuration example of the flip-flop circuit 500 in FIG. 5. The flip-flop circuits 501 to 507 also have a configuration similarity to that of the flip-flop circuit 500. The flip-flop circuit 500 includes switches 601, 602, and inverters 611 to 615. The inverters 611 to 615 logically invert input signals respectively and output the logically inverted signals. The inverters 611 and 612 configure a first holding circuit. The inverters 613 and 614 configure a second holding circuit.

Clock gating is performed for the clock signal CLK by the enable signal EN. That is, when the enable signal EN is at the high level, the clock signal CLK is input to the flip-flop circuit 500 as it is, and when the enable signal EN is at the low level, the clock signal CLK to be input to the flip-flop circuit 500 is fixed at the low level.

When the clock signal CLK becomes the high level, the switch 601 is turned on and the switch 602 is turned off. Thereafter, the first holding circuit configured by the inverters 611 and 612 inputs the data D0 and holds the data D0.

Next, when the clock signal CLK becomes the low level, the switch 601 is turned off and the switch 602 is turned on. Thereafter, the second holding circuit configured by the inverters 613 and 614 inputs the data output from the first holding circuit to hold. The inverter 615 logically inverts the data held in the first holding circuit and outputs the output data Q0.

At the time of power-on, values to be stored in the first holding circuit configured by the inverters 611 and 612 and the second holding circuit configured by the inverters 613 and 614 are indefinite values. Herein, in the flip-flop circuits 500 to 507 whose processes for which the flip-flop circuits 500 to 507 are made and power-on conditions (the way how the power supply starts up) are the same, the values to be held therein tend to be the same. This characteristic is employed in the present embodiment.

In FIG. 5, the plural-bit flip-flop circuit 101 does not include a reset terminal, and is a flip-flop circuit that is not initialized by reset, and stores the indefinite value at the time of power-on. Practically, the value of the plural-bit flip-flop circuit 101 at the time of power-on significantly depends on the process for which the plural-bit flip-flop circuit 101 is made and the power-on conditions (the way how the power supply starts up and so on). There are distributed the data Q0 to Q7 output from the plural flip-flop circuits 500 to 507 to which the same power supply voltage V1 is supplied in the same semiconductor chip after power-on statistically all at the high level or at the low level, and there is an extremely low probability of mixing the high level and the low level at 50% each. This characteristic is employed in the present embodiment.

Herein, controlling the data D and the enable signal EN by a software process in the CPU 402 only makes the plural-bit flip-flop circuit 101 possible to write. Further, the fixed values AA0 to AA7 are constituted by the values including the high level and the low level at 50% each. Accordingly, at the time of power-on, there is an extremely high probability that the data Q0 to Q7 output from the multi-bit flip-flop circuit 101 and the fixed values AA0 to AA7 become the different values. The comparator 102 outputs the power-on detect flag A1 at the low level when the output data Q0 to Q7 and the fixed values AA0 to AA7 are different. As a result, the power-on detect flag PR becomes the high level.

In order to increase accuracy of power-on detection, the more the numbers of bits of the data Q and the fixed value AA to compare become (for example, sixteen bits), the better it is. For example, the plural-bit flip-flop circuit 101 is set to be constituted by sixteen bits, and further, the sixteen-bit fixed value AA is set as "a 5 a 5 (hexadecimal number)" including the high level (indicating "1") and the low level (indicating "0") at 50% each, and the like.

Figure 7:
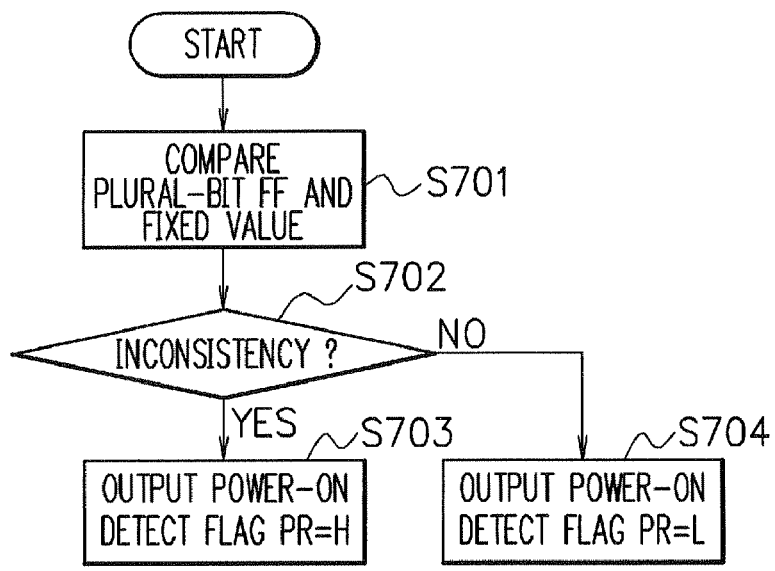
FIG. 7 is a flowchart depicting processes of the power-on detection circuit.

FIG. 7 is a flowchart depicting processes of the power-on detection circuit 403. At Step S701, the comparator 102 compares the eight-bit data Q output from the plural-bit flip-flop circuit 101 and the eight-bit fixed value AA. Next, at Step S702, the process proceeds to Step S703 when both are inconsistent with each other, and the process proceeds to Step S704 when both are consistent with each other. At Step S703, the inverter 103 makes the power-on detect flag PR the high level and outputs it. At Step S704, the inverter 103 makes the power-on detect flag PR the low level and outputs it. The above-described processes are repeated in the power-on detection circuit 403. As described above, the power-on detect flag PR becomes the high level at the time of power-on, therefore, it is possible to detect that power-on by the power switch SW is performed.

Figure 8:
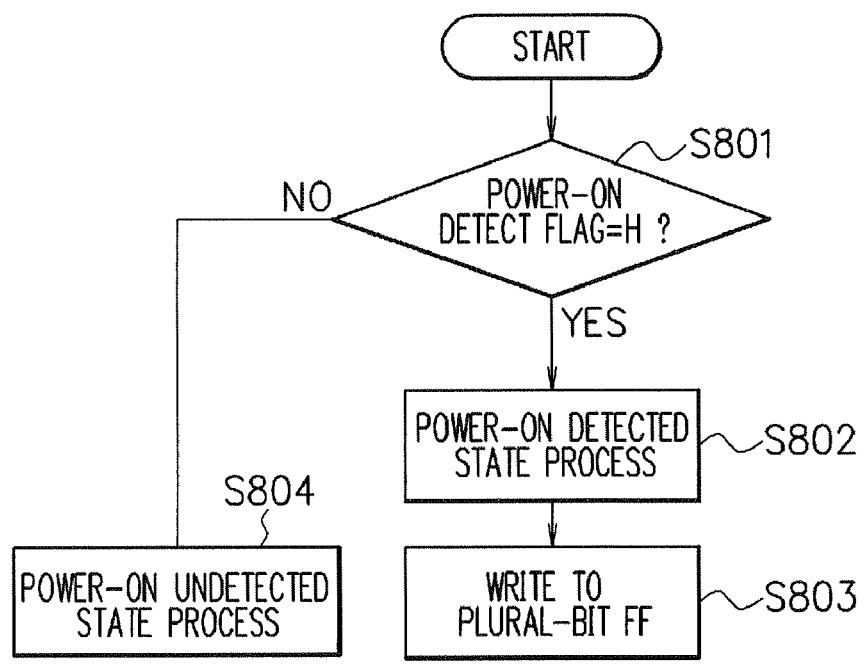
FIG. 8 is a flowchart depicting processes of a CPU.

FIG. 8 is a flowchart depicting processes of the CPU 402. At Step S801, the CPU 402 checks whether or not the power-on detect flag PR is at the high level, and the process proceeds to Step S802 when the power-on detect flag PR is at the high level, and otherwise when the power-on detect flag PR is at the low level, the process proceeds to Step S804.

At Step S802, the CPU 402 detects power-on since the power-on detect flag PR is at the high level, and performs a power-on detected state process. Namely, the CPU 402 performs a reset process accompanying power-on when a reset signal is input. For example, there is performed a process that security is turned on.

Next, at Step S803, the CPU 402 outputs the eight-bit data D that is the same value as the eight-bit fixed value AA to the plural-bit flip-flop circuit 101 to make the eight-bit data D store therein. At this time, the CPU 402 changes the enable signal EN from the low level to the high level. Thereafter, when the enable signal EN at the high level is input, the plural-bit flip-flop circuit 101 latches the data D input from the CPU 402 and outputs the data D as the data Q. Since the data Q is the same as the fixed value AA, the comparator 102 outputs the power-on detect flag A1 at the high level. As a result, the power-on detect flag PR becomes the low level. Resetting the power-on detect flag PR to the low level makes it possible to record that the above-described reset process accompanying power-on is ended. The power-on detect flag PR is a flag, for example, to perform the reset process accompanying power-on.

At Step S804, since the power-on detect flag PR is at the low level, the CPU 402 does not detect a power-on operation by the power switch SW and performs a power-on undetected state process. That is, the CPU 402 performs a reset process not accompanying power-on when the reset signal is input. For example, the CPU 402 performs a process to continue a security state before reset.

As described above, the CPU 402 performs the processes in FIG. 8 when the reset signal is input. There are two kinds of reset processes in reset of the microcontroller 401, which are the reset process accompanying power-on by the power switch SW and the reset process not accompanying power-on.

The CPU 402 performs the process depending on the power-on detect flag PR. For example, after the reset signal is input, the CPU 402 performs the reset process accompanying power-on at Step S802 when the power-on detect flag PR is at the high level, and the CPU 402 performs the reset process not accompanying power-on at Step S804 when the power-on flag PR is at the low level.

The CPU 402 performs the reset process depending on the power-on detect flag PR when the reset signal is input. For example, the CPU 402 performs the process to turn security on at Step S802 when the power-on detect flag PR at the high level is input, and the CPU 402 performs the process to continue the security state before reset at Step S804 when the power-on detect flag PR at the low level is input.

At Step S802, the CPU 402 performs the process to turn security on. For example, the CPU 402 makes a security function to prevent an unauthorized person from reading an internal memory of the microcontroller 401 effective, and performs a process to lead a user to input a password. Reading the internal memory is allowed by the CPU 402 only in the case when an appropriate password is input.

Further, at Step S804, the CPU 402 performs the process to continue the security state before reset. For example, in the case when security is released before reset, reading the internal memory is allowed by the CPU 402 not leading the user to input a password after reset.

As described above, the CPU 402 performs the reset process depending on the power-on detect flag PR when the reset signal is input. Concretely, the CPU 402 performs the process to turn security on when the power-on detect flag PR indicating that the data Q and the fixed value AA are inconsistent with each other is input, and the CPU 402 performs the process to continue the security state before reset when the power-on detect flag PR indicating that the data Q and the fixed value AA are consistent with each other is input.

The power-on detection circuit 403 including the plural-bit flip-flop circuit 101 and the comparator 102 in the present embodiment can be configured by the digital circuit (logic circuit). The circuit design is performed by using the HDL (hardware description language) in the digital circuit, and logically synthesizing makes it easier to convert to the various process rules. The development period, the development cost and/or the circuit size can be decreased in the power-on detection circuit 403 being the digital circuit compared with the analog circuit.

The power-on detection circuit 403 can be configured by the digital circuit, and thereby, the power-on detection circuit 403 is excellent in compatibility with the semiconductor process rule compared with the analog circuit. Further, since the circuit configuration of the power-on detection circuit 403 is simple, influence on the development period, the development cost, and the circuit size is small, and the power-on detection circuit 403 can realize the function to detect power-on easily. For, example, in the power-on detection circuit 403 being the digital circuit, the development period results in about 1/20, and the circuit size results in about 1/8 by area ratio compared with the analog circuit.

The flip-flop circuit and the comparator can be configured by the digital circuit, and thereby the development period, the development cost and/or the circuit size can be decreased compared with the analog circuit.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A power-on detection circuit comprising:
   a plural-bit flip-flop circuit storing an unknown value at the time of power-on and outputting plural-bit data; and
   a comparator comparing the plural-bit data output from the plural-bit flip-flop circuit and a plural-bit fixed value and outputting a power-on detect flag depending on a comparison result thereof,
   wherein the plural-bit flip-flop circuit inputs the same value data as the fixed value from a CPU to store when the power-on detect flag indicating that the data and the fixed value are inconsistent with each other is output from the comparator.

2. The power-on detection circuit according to claim 1, wherein
   as for the plural-bit fixed value, the number of bits of 1 and the number of bits of 0 are the same.

3. The power-on detection circuit according to claim 1, wherein
   at the time of power-on, the plural-bit flip-flop circuit outputs data based on the unknown value and the comparator outputs the power-on detect flag indicating that the data and the fixed value are inconsistent with each other.

4. A microcontroller comprising:
   a power-on detection circuit; and
   a CPU, and wherein
   the power-on detection circuit comprises:
      a plural-bit flip-flop circuit storing an unknown value at the time of power-on and outputting plural-bit data; and
      a comparator comparing the plural-bit data output from the plural-bit flip-flop circuit and a plural-bit fixed value and outputting a power-on detect flag depending on a comparison result thereof, and
   the CPU outputs the same value data as the fixed value to the plural-bit flip-flop circuit to store when the power-on detect flag indicating that the data and the fixed value are inconsistent with each other is input from the comparator.

5. The microcontroller according to claim 4, wherein
   as for the plural-bit fixed value, the number of bits of 1 and the number of bits of 0 are the same.

6. The microcontroller according to claim 4, wherein
   at the time of power-on, the plural-bit flip-flop circuit outputs data based on the unknown value and the comparator outputs the power-on detect flag indicating that the data and the fixed value are inconsistent with each other.

7. The microcontroller according to claim 4, wherein
   the CPU performs a reset process depending on the power-on detect flag when a reset signal is input.

8. The microcontroller according to claim 7, wherein
   at the time of reset, the CPU performs a process to turn security on when the power-on detect flag indicating that the data and the fixed value are inconsistent with each other is input, and the CPU performs a process to continue a security state before reset when the power-on detect flag indicating that the data and the fixed value are consistent with each other is input.

* * * * *